United States Patent
Disch et al.

(10) Patent No.: US 9,914,155 B2
(45) Date of Patent: Mar. 13, 2018

(54) METHOD FOR OPERATING A DISHWASHER, AND DISHWASHER

(71) Applicants: Harald Disch, Elzach (DE); Dietrich Berner, Waldstetten (DE); Ralf Schmidt, Freising (DE); Reiner Worz, Reichertshausen (DE); Peter Maier-Laxhuber, Pfaffenhofen a.d Ilm (DE)

(72) Inventors: Harald Disch, Elzach (DE); Dietrich Berner, Waldstetten (DE); Ralf Schmidt, Freising (DE); Reiner Worz, Reichertshausen (DE); Peter Maier-Laxhuber, Pfaffenhofen a.d Ilm (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 140 days.

(21) Appl. No.: 14/893,592

(22) PCT Filed: Jun. 5, 2014

(86) PCT No.: PCT/US2014/040979
§ 371 (c)(1),
(2) Date: Nov. 24, 2015

(87) PCT Pub. No.: WO2014/197645
PCT Pub. Date: Dec. 11, 2014

(65) Prior Publication Data
US 2016/0088996 A1   Mar. 31, 2016

(30) Foreign Application Priority Data

Jun. 5, 2013  (DE) .................. 10 2013 210 468
Jul. 8, 2013   (DE) .................. 10 2013 213 359

(51) Int. Cl.
*B08B 5/00*  (2006.01)
*A47L 15/48* (2006.01)
(Continued)

(52) U.S. Cl.
CPC ............ *B08B 5/00* (2013.01); *A47L 15/0013* (2013.01); *A47L 15/0042* (2013.01);
(Continued)

(58) Field of Classification Search
CPC .... B08B 3/20; B08B 5/00; B08B 5/02; A47L 15/0013; A47L 15/0042; A47L 15/0076;
(Continued)

(56) References Cited

U.S. PATENT DOCUMENTS

| 2011/0017235 A1 | 1/2011 | Berner et al. |
| 2011/0114141 A1 | 5/2011 | Classen et al. |
| 2011/0139193 A1* | 6/2011 | Jerg ............. A47L 15/4291 134/115 R |

FOREIGN PATENT DOCUMENTS

| CN | 102105094 | 6/2011 |
| CN | 102131440 | 7/2011 |

(Continued)

OTHER PUBLICATIONS

PCT, International Search Report and Written Opinion, International Application No. PCT/US2014/040979 dated (Sep. 9, 2014).

*Primary Examiner* — Saeed T Chaudhry
(74) *Attorney, Agent, or Firm* — Thompson Hine LLP (57) ABSTRACT

A method is provided for operating a dishwasher (1) in the form of a batch dishwasher, which has a treatment chamber (2) for accommodating washware to be cleaned. Provision is made, during an adsorption phase, for air to be conducted out of the treatment chamber (2) through a sorption unit (41), which contains a reversibly dehydratable dry material, in such a way that the dry material absorbs moisture from the (Continued)

air stream, wherein the air is then returned to the treatment chamber (2). Provision is further made, during a desorption phase, for the dry material of the sorption unit (41) to be heated in such a way that moisture is desorbed from the dry material as steam. During the desorption phase, the sorption unit (41) is subjected to forced ventilation only to such an extent that recondensation of desorbed steam in the sorption unit (41) itself is effectively prevented.

20 Claims, 3 Drawing Sheets (51) Int. Cl.
*B01D 53/26* (2006.01)
*A47L 15/00* (2006.01)

(52) U.S. Cl.
CPC ......... *A47L 15/0076* (2013.01); *A47L 15/481* (2013.01); *B01D 53/261* (2013.01); *A47L 15/0078* (2013.01); *A47L 2401/18* (2013.01); *A47L 2401/34* (2013.01); *A47L 2501/11* (2013.01); *A47L 2501/12* (2013.01); *A47L 2501/36* (2013.01); *A47L 2601/20* (2013.01); *B08B 2205/00* (2013.01)

(58) Field of Classification Search
CPC ............... A47L 15/0078; A47L 15/481; A47L 2401/11; A47L 2401/12; A47L 2401/18; A47L 2401/20; A47L 2401/36; B01D 53/26

See application file for complete search history.

(56) References Cited

FOREIGN PATENT DOCUMENTS

| | | |
|---|---|---|
| CN | 102209486 | 10/2011 |
| CN | 202665484 | 1/2013 |
| DE | 102005023429 A1 | 11/2006 |
| DE | 102008017597 A1 | 10/2009 |
| DE | 102008039900 A1 | 3/2010 |
| DE | 102011087322 A1 | 5/2013 |
| DE | 102012000013 A1 | 7/2013 |
| JP | 2006020753 | 1/2006 |
| WO | 2014/014857 A2 | 1/2014 |

\* cited by examiner

METHOD FOR OPERATING A DISHWASHER, AND DISHWASHER

CROSS-REFERENCE TO RELATED APPLICATIONS

This application is a National Stage filing of International Application No. PCT/US2014/040979, filed Jun. 5, 2014, which claims priority to German Application No. 10 2013 210 468.5, filed Jun. 5, 2013, and German Application No. 10 2013 213 359.6, filed Jul. 8, 2013, which are incorporated herein by reference in their entireties.

The invention relates to a method for operating a dishwasher which is in the form of a batch dishwasher, and to a corresponding dishwasher which is in the form of a batch dishwasher, and to a treatment chamber for receiving washware to be cleaned.

Batch dishwashers are dishwashers which can be loaded and unloaded manually. The batch dishwashers (also referred to as "box-type warewashers") may be hood-type warewashers or front-loader warewashers. Front-loader warewashers may be under-counter machines, top counter machines or free-standing front-loader warewashers.

A dishwasher configured as a batch dishwasher usually has a treatment chamber for cleaning washwear. A wash tank in which liquid can flow back out of the treatment chamber by gravity is usually arranged below the treatment chamber. The wash tank contains wash liquid, which is usually water, to which detergent may optionally be fed.

A dishwasher configured as a batch dishwasher customarily also has a wash system having a wash pump, having a line system connected to the wash pump and having a multiplicity of spray nozzles formed in at least one wash arm. The wash liquid located in the wash tank can be conveyed by the wash pump, via the line system, to the wash nozzles and sprayed in the treatment chamber, by the wash nozzles, onto the washwear to be cleaned. The sprayed wash liquid then flows back into the wash tank.

Such a dishwasher configured as a batch dishwasher is known, for example, from DE 10 2005 023 429 A1.

The term "washware" used here is to be understood, in particular, as being crockery, glassware, silverware, cooking utensils, baking utensils and serving trays.

A commercial dishwasher configured as a batch dishwasher differs from a domestic dishwasher, in particular, in that a commercial dishwasher has to be designed such that—depending on the washing program selected—it is possible to realize program running times of between 1 and 5 minutes, whereas domestic dishwashers usually have running times of up to 2.5 hours or more. The short program duration required for commercial dishwashers means that technology used in domestic dishwashers cannot readily be transferred to commercial dishwashers.

Commercial dishwashers which are configured as batch dishwashers usually operate in two main process steps: a first step, which contains washing with a wash liquid, and a second step, which contains final rinsing with heated fresh water and metered rinse aid.

In order for it to be possible to carry out these process steps, a commercial dishwasher configured as a batch dishwasher is usually provided with two independent liquid systems, which are completely separate from each other. The one liquid system is a wash-water circuit, which is responsible for washing the washware, wherein washing is carried out using recirculated water from the water tank of the dishwasher. The other liquid system is a fresh-water system, which is responsible for final rinsing. The final rinsing is carried out using fresh water, preferably using fresh water from a boiler. After the spraying, the fresh water is likewise collected by the wash tank of the dishwasher.

The main task of the final rinsing is that of removing detergent solution located on the washware. In addition, the final-rinse water which flows into the wash tank during the final-rinse step serves for regenerating the washwater present in the wash tank.

Before fresh water is sprayed, by the final-rinse operation, as final-rinse liquid and is thus conducted into the wash tank of the dishwasher, a quantity of wash liquid which is equal to the quantity of fresh water is pumped out of the wash tank.

Commercial dishwashers which are configured as batch dishwashers are customarily provided with a number of programs. These programs differ mainly by program running times of different lengths for the washing process. It is possible for the operator to select a short wash program if the washware is lightly soiled or, if the washwear is heavily soiled, to select a correspondingly longer wash program.

Commercial dishwashers which are configured as batch dishwashers and for loading batches of washware into, and unloading same from, the treatment chamber are, in particular, front-loader warewashers or hood-type warewashers. In the case of front-loader warewashers, the washware is placed into a rack, and the rack loaded with washware is positioned in the treatment chamber of the dishwasher through a front door and, following cleaning, removed again through the front door. In the case of hood-type warewashers, the crockery racks loaded with washware are pushed manually into the treatment chamber from an entry side and, after completion of a dishwashing program, removed manually from the treatment chamber from an exit side. Front-loader warewashers and hood-type warewashers contain just a single treatment chamber for treating the washware. The front-loader warewashers may be undercounter machines or top counter machines.

Two drying methods are mainly used in commercial dishwashers which are configured as batch dishwashers. In the first method, the washware, still hot following the final-rinse process, is removed from the machine with the washware then drying in the ambient air within four to ten minutes. In order for the washware to dry, in the case of the method described above, the washware is usually left in the racks in which the washware was arranged for cleaning purposes in the dishwasher.

In the second method, air drying takes place within the treatment chamber of the dishwasher. Use is made here of fresh-air drying systems. Such fresh-air drying systems for commercial front-loader warewashers or undercounter dishwashers always operate with a high volumetric flow rate of air within the range of 25 to 100 $m^3$ per hour, in order for it to be possible for the washware remaining in the treatment chamber to be dried in a very short period of time. The high volumetric flow rates of air are necessitated by the brevity of the drying operation in the commercial sector. In comparison with conventional drying in a domestic dishwasher, the active drying time of a commercial dishwasher is many times shorter. Whereas the drying-program running time in a domestic dishwasher is approx. 30 minutes to 2.5 hours, the drying-program running time in the commercial sector is between 1.5 and 5 minutes.

In the case of air drying in a commercial dishwasher configured as a batch dishwasher, fresh air is taken in from the outside and conducted through the treatment chamber of the dishwasher in order to absorb moisture from the washware to be dried. The moisture-laden drying air is usually then blown out as exhaust air into the area where the dishwasher is set up.

In particular in kitchens in which a number of dishwashers configured as batch dishwashers are operated, in some cases simultaneously, the action of blowing out the drying air into the area where the dishwashers are set up results in the temperature conditions of the area being adversely affected, since the action of blowing out the moisture-laden drying air, which is warm in comparison with the air in the area where the dishwashers are set up, inevitably increases the moisture content of the air in this area (ambient air). In particular, there is the risk here of the moisture content in the air in the area where the dishwashers are set up being increased to such an extent that steam condenses undesirably in particular on cool boundary surfaces in the area where the dishwashers are set up.

In order to counter this problem, it is known, from the commercial dishwashing sector, for the exhaust air which is to be expelled from the treatment chamber of the dishwasher during the drying phase to be conducted, in the first instance, through a drying channel, in which at least a part of the moisture contained in the exhaust air is separated from the exhaust air by condensation before the subsequently cooled exhaust air, with correspondingly reduced moisture content, is then discharged outward via a blow-out opening of the dishwasher, i.e. is discharged into the atmosphere of the area where the dishwasher is set up. In specific terms, at least a part of the moisture which is expelled from the treatment chamber together with the exhaust air condenses in the drying channel.

The vastly shortened drying operation which is required for commercial dishwashers in comparison with domestic dishwashers gives rise to the not insignificant risk that—in particular on account of the volumetric flow rate of air which is conducted through the treatment chamber of the dishwasher during the drying phase—the condensation which collects in the drying chamber is also blown out through the blow-out opening of the dishwasher. There is also the risk of relatively small quantities of wash liquid and final-rinse liquid also passing into the drying channel, since the drying channel is usually connected to the interior of the dishwasher. In stand-by phases and when the machine is first started up each day, or when the machine is being heated up, it is likewise possible for droplets of condensation to form in the drying channel.

If the drying operation is then started, the high air speeds entrain the water droplets located or suspended in the drying channel and convey or blow them out of the blow-out opening of the dishwasher. Furthermore, a water film forming on the base of the drying channel is partly discharged through the blow-out opening by the air stream. This leads firstly to individual droplets being hurled out of the dishwasher into the surroundings and secondly to dripping water running out of the channel outlet at, for example, the front side of the machine. The overall quantity of water which is discharged in this manner and which varies depending on the type of operation or cycle sequence may be up to approximately 10 ml during an individual drying phase.

Furthermore, in the case of commercial dishwashers in the form of a batch dishwasher, the drying channel is usually not of sufficiently large dimensions in order for the moisture content of the exhaust air which is to be expelled from the treatment chamber of the dishwasher to be reduced to the extent where this exhaust air corresponds to the moisture content of the air (ambient air) in the area where the dishwasher is set up. In the case of conventional dishwashers, the action of blowing out the exhaust air into the area where the dishwasher is set up thus inevitably results in an increase in the moisture in the ambient air, i.e. in the air in the area where the dishwasher is set up.

Accordingly, one problem with the commercial dishwashers which are known from the prior art and are configured as batch dishwashers is that of continued undesirable discharge of water from the dishwasher during the drying operation (drying phase), as the dishwasher runs through its program, despite the provision of a drying channel.

The invention is intended to achieve the object of creating a possibility through which a discharge of water from a commercial dishwasher can be further reduced, wherein it is intended, in particular, to ensure that the dishwasher can be operated in a manner which is as simple as possible to realize even without a complicated drying channel system in the area where the dishwasher is set up. Furthermore, a corresponding method for operating such a commercial dishwasher in the form of a batch dishwasher is intended to be provided.

This object is achieved, in respect of the method, by the subject matter of independent patent claim 1 and, in respect of the dishwasher, by the subject matter of independent patent claim 17. Advantageous developments of the solution according to the invention are specified in the dependent patent claims.

Accordingly, a commercial dishwasher which is in the form of a batch dishwasher and has a treatment chamber for accommodating washwear which is to be cleaned is proposed. According to the invention, a drying system is provided for forming an air circuit in the treatment chamber and for drying the washwear, which is accommodated in the drying chamber, during a drying phase. The drying system has a drying device for continuously drawing moisture, or drawing moisture as required, from the drying air which circulates in the treatment chamber. For this purpose, the drying device comprises a sorption unit, which contains a reversibly dehydratable dry material, and a fan, which is assigned to the sorption unit, for forming an air circuit as required in such a way that some of the drying air circulating in the treatment chamber is conducted through the sorption unit.

The sorption unit is alternately operated in an adsorption phase and in a desorption phase. During the adsorption phase, air is conducted out of the treatment chamber of the dishwasher through the reversibly dehydratable dry material of the sorption unit in such a way that the dry material absorbs moisture from the air stream, wherein the air is then returned to the treatment chamber of the dishwasher. During the desorption phase, the dry material of the sorption unit is heated, and at the same time air is forcibly guided out of the treatment chamber through the sorption unit, in such a way that moisture is desorbed from the dry material and at least some of the thermal energy introduced into the dry material and at least some of the moisture desorbed from the dry material in the form of steam are discharged from the sorption unit with the aid of the air stream forcibly guided through the sorption unit. It is essential here that for most advantageous implementation of the invention that, during the desorption phase, air is preferably continuously blown through the sorption unit.

With regard to the dishwasher which is in the form of a batch dishwasher, it is proven particularly efficient if, during the desorption phase, the sorption unit is subjected, for example, by a fan assigned to the sorption unit, to forced ventilation. In order to save resources (in particular energy) and in order to discharge as little thermal energy as possible from the sorption unit, the forced ventilation should preferably only be undertaken in such a way that recondensation of desorbed steam in the sorption unit is specifically effectively prevented. In other words, according to preferred embodiments of the present invention, during the desorption phase, air is conducted through the sorption unit specifically in such an amount that the steam desorbed from the dry material is discharged from the sorption unit in order to prevent recondensation in the sorption unit, which would be disadvantageous for the operation of the dishwasher.

It has been determined that it is already sufficient if a total of 10 liters of air is blown through the sorption unit during the desorption phase in order to prevent recondensation of desorbed steam in the sorption unit. It is in particular conceivable here, for the forced ventilation of the sorption unit, to provide a fan with which air, in particular air from the treatment chamber of the dishwasher, is continuously or intermittently blown during each desorption phase.

According to the invention, during the desorption phase, the dry material of the sorption unit is raised or heated to the necessary desorption temperature with the aid of a heating device installed within the sorption unit, in particular an electric heating device in the form of, for example, a heating coil. If a zeolite material is used as the dehydratable dry material, the desorption temperature is between 150° C. and 280° C. depending on the degree of dehumidification sought. In respect of a particularly efficient operation of the sorption unit during the desorption phase, it is advantageous in this context if the temperature of the heated dry material is measured continuously or at predefined or predefinable times or in the case of predefined or predefinable events in the sorption unit during each desorption phase, wherein the output capacity of a fan assigned to the sorption unit is controlled as a function of the measured temperature of the heated dry material in such a way that the dry material assumes a temperature of less than 300° C., and preferably of less than 250° C.

However, alternatively or in addition, it is also conceivable for the temperature of the air which is guided through the heated dry material to be measured continuously or at predefined or predefinable times or in the case of predefined or predefinable events during each desorption phase, wherein, however, the heating power of a heating unit which is arranged in the sorption unit is then controlled as a function of the measured temperature of the heated dry material in such a way that the dry material assumes a temperature of less than 300° C., and preferably of less than 250° C., in the desorption phase.

In order to achieve as short a desorption time as possible, which is desirable in particular in the case of commercial dishwashers, a relatively high heating power has to be introduced into the dry material during the desorption phase. In this connection, it is advantageous if use is made of a heating device with a multiplicity of heating elements which are preferably arranged at uniform distances within the reversible dehydratable dry material. It has been shown here that a distance of 5 mm to at maximum 25 mm, preferably up to at maximum 15 mm, between the individual heating elements is particularly preferred, since, at this distance, a specific heating power of more than 6000 watts per kilogram of dry material (zeolite) can be used. If the distance between adjacent heating elements is increased to more than 25 mm, the specific heating power is reduced to 2000 watts per kilogram of dry material.

The surface loads of the respective heating elements can be up to 6 watts per square centimeter. The air stream guided continuously through the sorption unit during the desorption phase here prevents the permissible maximum contact temperatures being exceeded during the desorption operation. For zeolites, the permissible maximum contact temperature during the desorption operation is around approximately 550° C. At higher temperatures, zeolites exhibit the start of degeneration.

In particular, it is therefore possible for the thermal energy required for the desorption to be conducted at high power and with an active movement of air into the sorption agent fill. The temperature profile arising in the process is then highly homogeneous. In particular, it is prevented that relatively cool regions are present within the sorption unit, for example in the wall region of the sorption container, while a few millimeters next thereto in contact with the heating elements, significantly higher temperatures are present. It is therefore possible that the dry material can be particularly rapidly regenerated and therefore dried during the desorption phase. The air stream which is forced through the dry material likewise serves to discharge the desorbed steam from the sorption unit.

According to a preferred realization of the solution according to the invention, it is provided that the temperature of the dry material heated during the desorption phase is measured continuously or at predefined or predefinable times or in the case of predefined or predefinable events, wherein the output capacity of a fan for forming the air stream which is forced through the sorption unit is controlled as a function of the measured temperature of the heated dry material in such a way that the dry material basically does not exceed the critical maximum contact temperature. As already indicated, the maximum critical contact temperature for the desorption of zeolites is around 550° C.

In this connection, it is conceivable for the output capacity of the fan to be set in such a way that the dry material has a temperature of between 150° C. and 280° C. At this desorption temperature, the drying of the dry material is particularly efficient.

On the other hand, care should be taken to ensure that, after passing through the heated dry material, the air stream is not too hot, and therefore the air stream can be introduced directly into the treatment chamber of the dishwasher without a need to worry here that the washware will be damaged. For this reason, it is provided, according to one aspect of the present invention, that the temperature of the air which is forced through the heated dry material is measured continuously or at predefined or predefinable times or in the case of predefined or predefinable events during each desorption phase, wherein the output capacity of the fan is controlled as a function of the measured temperature of the air which is forced through the heated dry material in such a way that the air which is forced through the dry material assumes a temperature of less than 200° C., and preferably of less than 150° C.

In one implementation, the dry material is, in particular, a sorption agent which contains zeolite. Zeolite is a crystalline mineral which contains oxides of silicon and aluminum in the skeleton structure. The regular skeleton structure contains cavities in which water molecules can be adsorbed, with heat being released in the process. Within the skeleton structure, the water molecules are exposed to strong field forces, the strength of which depends, inter alia, on the quantity of water already contained in the lattice structure and on the temperature of the zeolite material. A suitable dry material here is, in particular, type Y zeolite, since this material is particularly stable even under extreme hydrothermal conditions.

At least one fan is provided in the dishwasher according to the invention in order, as required, to form an air circuit in such a way that at least some of the air is conducted out of the treatment chamber of the dishwasher through the sorption unit and is subsequently returned to the treatment chamber. The air stream through the sorption unit, which contains the heated dry material, is therefore preferably produced with the aid of the fan mentioned, wherein said fan can already conduct air out of the treatment chamber of the dishwasher through the sorption unit during the adsorption phase. Of course, however, it is also conceivable here for use to be made of a further (additional) fan.

The term "reversibly dehydratable dry material" used here should generally be understood as being a sorption agent or sorbent which is intended to store moisture during an adsorption phase, wherein at least a part of the moisture stored during the adsorption phase is discharged or released again in what is referred to as a regeneration phase. As already explained, moisture is drawn from the air during the adsorption phase. At the same time, the adsorption of water by the dry material releases energy which consequently heats the dried air.

In order to initiate the regeneration phase, energy (in particular in the form of heat) has to be fed to the dry material, whereupon the latter releases the bound water again.

The provision of a sorption unit containing a reversibly dehydratable dry material therefore permits air drying in the treatment chamber of the dishwasher with drying air without the drying air subsequently having to be blown outward into the atmosphere of the area where the dishwasher is set up, since, owing to the provision of the sorption unit, the drying air can be continuously used in the treatment chamber.

The reversibly dehydratable drying agent consists, in one embodiment, of 0.3 to 3.0 kg, preferably of 1.0 to 1.5 kg, of zeolite-containing material. In this connection, it has been determined that, for a commercially available dishwasher which is in the form of a batch dishwasher, a quantity of 0.3 to 3.3 kg, preferably 1.0 to 1.5 kg, of zeolite-containing material to a thickness of 2 to 100 millimeters is sufficient in order to achieve the desired drying properties. In detail, it is advantageous here if the zeolite-containing dry material is in the form of granules having a particle diameter of 0.5 to 10 millimeters. Of course, the size and shape of the granules are also crucial, since tightly packed dry material clearly greatly increases the flow resistance whereas dry material having a relatively large diameter can very easily be passed through by the air which is forced therethrough.

For the regeneration of the dehydratable dry material during the desorption phase, the dry material is heated in order again to discharge the moisture introduced previously into the dry material. For this purpose, it is provided that the drying device has a heating device for heating the reversibly dehydratable dry material as required, wherein the heating device has a power of 1 to 14 kW, preferably 4 to 8 kW. The heating power of 1 to 14 kW is matched in particular to the amount of dry material, and therefore a desorption time of a few minutes can be achieved. Furthermore, attention should be paid when selecting the heating power that the housing around the drying unit is not damaged.

The heating device preferably has a multiplicity of heating elements which are arranged at uniform distances within the reversibly dehydratable dry material. By means of the arrangement of a multiplicity of heating elements within the reversible dehydratable dry material, the heating energy required for the desorption can be introduced within a very short time into the dry material. Furthermore, the distribution of the heating elements at uniform distances ensures that the dehydratable dry material can be heated particularly homogeneously. The heating elements here can be designed, for example, as plates or windings of a coil, which extend over the entire volume of the dry material.

According to a further aspect of the present invention, the drying device also has a heat exchanger unit which is connected to the sorption unit in such a way that, when an air circuit is formed, at least some of the air stream which is routed through the sorption unit subsequently passes through the heat exchanger unit. Said heat exchanger unit can have, for example, a heat exchanger which is cooled with water, in particular fresh water, and also an inlet which is connected or can be connected to a fresh-water feed line, and an outlet which is connected or can be connected to the wash nozzle system of the dishwasher and/or to the final-rinse system of the dishwasher. In this manner, the heat expelled from the sorption unit during the sorption phase can be at least partially used in order to heat up the fresh water subsequently used as wash liquid or final-rinse liquid.

Exemplary embodiments of the solution according to the invention will be described in more detail below with reference to the accompanying drawings, in which.

The invention relates to commercial dishwashers, in particular crockery or utensil washers, in the form of a batch dishwasher. They customarily contain program control devices for controlling at least one cleaning program, and a treatment chamber 2, which can be closed by a door (not shown) or a hood (not shown), in a machine housing for accommodating washware (not shown) to be cleaned, such as, for example, crockery, silverware, pots, pans and trays.

A wash tank 12 for accommodating sprayed liquid from the treatment chamber 2 is located below the treatment chamber 2. A wash pump 13 is provided for conveying wash liquid out of the wash tank 12, through a wash liquid line system 16, to wash nozzles 11a, 11b, which are directed, in the treatment chamber 2, onto the region of the washwear to be cleaned and which spray the wash liquid onto the washwear to be cleaned. The sprayed wash liquid returns to the wash tank 12 due to the force of gravity. The wash tank 12, the wash pump 13, the wash liquid system 16 and the wash nozzles 11, together with the treatment chamber 2, thereby form a wash liquid circuit. The wash liquid line system 16 connects the pressure side of the wash pump 13 to the wash nozzles 11a, 11b.

Also provided is a final-rinse system for conveying final-rinse liquid, by means of a final-rinse pump 14, through a final-rinse line system 17 to final-rinse nozzles 15a, 15b, which are directed, in the treatment chamber 2, onto the region of the washwear to be cleaned. The sprayed final-rinse liquid returns from the treatment chamber 2 into the wash tank 12 due to the force of gravity. The final-rinse liquid system 17 connects the pressure side of the final-rinse pump 14 to the final-rinse nozzles 15a, 15b.

It is possible for the wash nozzles 11a, 11b and the final-rinse nozzles 15a, 15b to be arranged within the treatment chamber in the regions above and/or below and, if desired, also to the sides of the washwear region, and to be directed in each case toward the region in which the washwear is positioned.

It is preferable for a multiplicity of wash nozzles 11a to be provided on at least one upper wash arm, for a multiplicity of wash nozzles 11b to be provided on a lower wash arm, for a multiplicity of final-rinse nozzles 15a to be provided on at least one upper final-rinse arm, and for a multiplicity of final-rinse nozzles 15b to be provided on at least one lower final-rinse arm.

Before final-rinse liquid is sprayed during the final-rinse phase, in each case a quantity of wash liquid which corresponds to the final-rinse liquid is pumped out of the wash tank 12 by means of a drainage pump 5, the suction side of which is connected, via a discharge line, to a sump of the wash tank. If the wash tank 12 is empty prior to initial starting of the dishwasher 1 in the form of a batch dishwasher, it must first be filled with fresh water via a fresh water line (not shown) or with fresh water or another final-rinse liquid or wash liquid by means of the final-rinse system and the final-rinse pump 14 thereof.

The final-rinse liquid may be fresh water or fresh water mixed with rinse aid. By contrast, the wash liquid contains detergent, which is added, preferably automatically, to the liquid contained in the wash tank 12 by means of a detergent-metering device (not shown). The abovementioned program control device controls the wash pumps 13, the final-rinse pump 14, the drainage pump 5 and the detergent-solution pump (not shown) in dependence on the cleaning program selected by an operator in each case using the program control device. At least one cleaning program is provided, and preferably a plurality of optionally selectable cleaning programs are provided.

Figure 1:
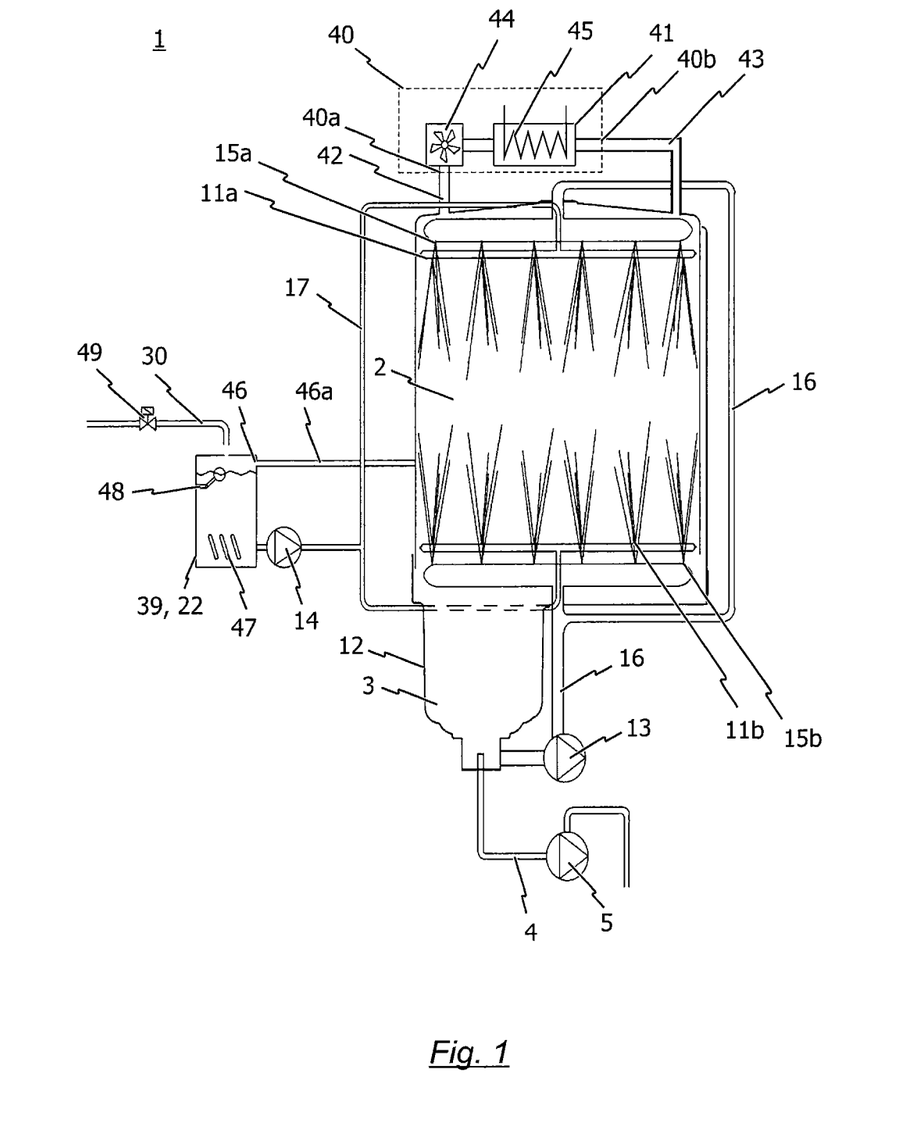
FIG. 1 shows schematically a dishwasher, in particular a commercial dishwasher, in the form of a batch dishwasher according to a first embodiment of the invention.

From the embodiment, which is illustrated in FIG. 1, of the dishwasher 1 according to the invention, the intake side of a final-rinse pump 14 is furthermore connected to an outlet of a boiler 22. The boiler 22 furthermore has an inlet which is connected to a fresh-water supply line 30, via which inlet either fresh water or fresh water with added rinse aid is supplied to the boiler 22. In the boiler 22, the liquid (pure fresh water or fresh water with added rinse aid) supplied via the inlet is heated up in accordance with a specific process sequence. Via the final-rinse pump 14, the intake side of which is connected to the boiler exit, the final-rinse liquid heated up in the boiler 22 can be supplied to the final-rinse nozzles 15a and 15b, via the final-rinse line system 17, for example during a fresh-water final-rinse phase. The final-rinse nozzles 15a and 15b are arranged in the treatment chamber 2, in order for the final-rinse liquid heated up in the boiler 22 to be sprayed onto the washware in the treatment chamber 2. Of course, it is also conceivable for the boiler to be supplied, via the inlet into the fresh-water supply line 30, with pure fresh water which, following heating in the boiler, has a rinse aid added thereto.

Figure 2:
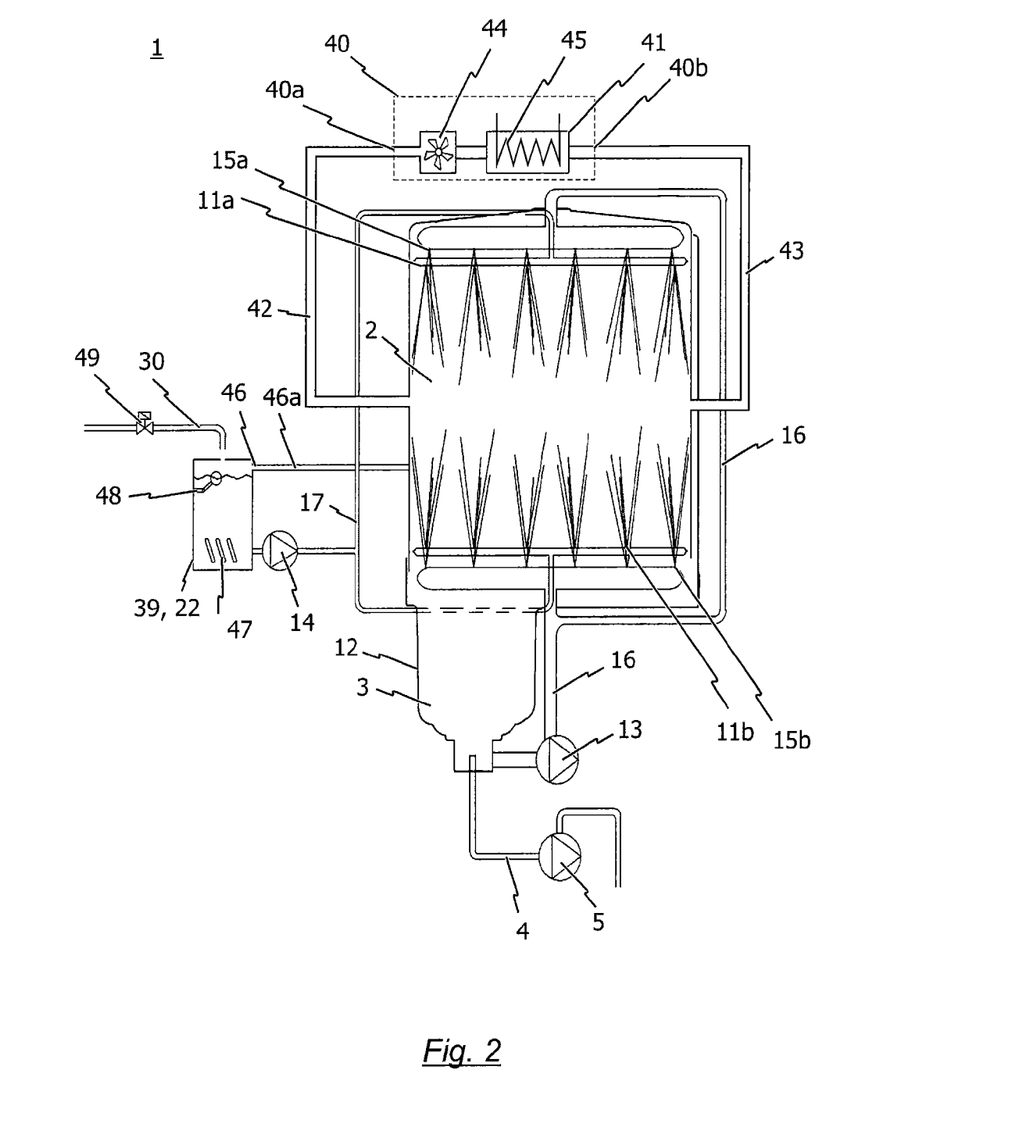
FIG. 2 shows schematically a dishwasher, in particular a commercial dishwasher, in the form of a batch dishwasher according to a second embodiment of the invention.

In the embodiment of the dishwasher 1 according to the invention that is illustrated in FIGS. 1 and 2, the final-rinse system has a preferably electrically operated steam generator 39 which—as illustrated in the figures—may be integrated, for example, in the boiler 22. In this case, a corresponding steam outlet 46 of the steam generator 39 is formed on the upper region of the boiler 22. The steam outlet 46 of the steam generator 39 is connected to the treatment chamber 2, via a steam line 46a, at a location situated above the wash tank 12 in order for the steam generated in the steam generator 39 to be introduced into said treatment chamber where necessary. The outlet opening of the steam line 46a is preferably located between the upper nozzles 11a, 15a of the wash system and fresh-water final-rinse system, respectively, and the lower nozzles 11b, 15b. Of course, other positions are nevertheless also possible.

The boiler 22, which, according to the embodiments illustrated in FIGS. 1 and 2, serves for generating steam, where necessary, in addition to heating the final-rinse liquid, contains a heater 47. It is also possible for a level sensor 48, which controls, for example, a valve 49 of the fresh-water line 30, to be arranged in or on the boiler 22.

The dishwasher 1 according to the invention furthermore has a drying device 40 for extracting moisture from the drying air circulating in the treatment chamber 2 continuously or when required. The drying device 40 has at least one sorption unit containing a reversibly dehydratable dry material. Said sorption unit 41 is customarily a container in which a reversibly dehydratable dry material is placed. Said dry material is preferably a sorption agent which contains zeolite. A suitable dry material is, in particular, type Y zeolite, since this material is particularly stable even under extreme hydrothermal conditions. The drying device furthermore contains at least one fan 44 for, where necessary, forming an air circuit in such a way that at least some of the air from the treatment chamber 2 is conducted through the sorption unit 41 via an air inlet 40a and is subsequently returned to the treatment chamber 2 via an air outlet 40b.

As can be gathered in particular in FIGS. 1 and 2, the drying device 40 is arranged above the treatment chamber 2. In other words, the drying device 40 with the fan 44 and the sorption unit 41 is preferably mounted on the machine roof of the dishwasher 1. This has the advantage that, for example, the wash liquid already mentioned above can only pass into the interior of the drying device 40 with difficulty and therefore flows back exclusively into the wash tank 12 under the influence of the force of gravity. The dry material located in the sorption unit 41 is therefore effectively protected from spray water and condensation water.

The air inlet 40a of the drying device 40 is connected to the treatment chamber 2 preferably via an inlet line 42, wherein the inlet line 42 is connected laterally (FIG. 2) or at the top (FIG. 1) to the treatment chamber 2. In an equivalent manner thereto, the air outlet 40b of the drying device is connected to the treatment chamber 2 preferably via an outlet line 43, wherein the outlet line 43 is connected laterally (FIG. 2) or at the top (FIG. 1) to the treatment chamber 2. It should be mentioned at this juncture that the inlet and outlet lines 42, 43 can both have a valve for closing the connection between treatment chamber and drying device 40 when required. An air circuit can be formed via the inlet and outlet lines 42, 43, with the aid of the associated fan 44, where necessary, in such a way that at least some of the air is sucked up out of the treatment chamber 2 and supplied to the sorption unit 41 via the inlet line 42. Said air sucked up from the treatment chamber 2 is subsequently conducted through the sorption unit 41 and the dry material and then returned to the treatment chamber 2 via the outlet 40b of the drying unit 40 and the outlet line 43.

In order for it to be possible to regenerate the dry material of the sorption unit 41 during the desorption phase, it is necessary—as already explained—to heat the dry material correspondingly. For this purpose, in the case of the embodiments of the dishwasher 1 according to the invention that is illustrated in drawings 1 and 2, the sorption unit 41 is assigned a, for example, electrically operated heating device 45 which is intended to heat, where necessary, the dry material of the sorption unit 41 during a desorption phase or directly before the desorption phase is initiated. The desorption sub-process is carried out following the adsorption phase, to be precise by the sorption unit 41 being supplied with heat, for example in the form of electrical energy, steam, gas or hot water. Simultaneously or with a time lag, through the sorption unit 41 located in the desorption phase, air is blown out of the treatment chamber 2 of the dishwasher 1 via the inlet line 43, with the aid of the fan 44, said air absorbing the water desorbed as steam from the dry material.

The heating unit 45 (merely illustrated schematically) can have a large number of heating elements which are arranged at an identical distance within the reversibly dehydratable material. The heating elements here may be, for example, heating rods or heating plates which are distributed over the entire volume of the sorption unit 41. The powerful binding forces in relation to water mean that the dry material should preferably be heated to 150° C. to over 300° C. in order to obtain as little residual moisture content within the dry material as possible. The large number of heating elements (not illustrated) should therefore be spaced in particular sufficiently far from the housing walls of the drying device 40 that said housing walls are not damaged by the high temperatures of up to 400°.

Figure 3:
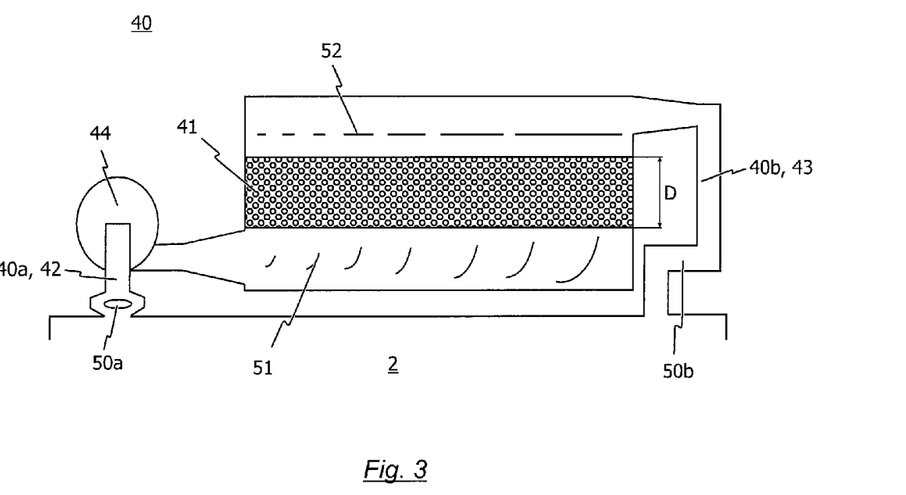
FIG. 3 shows schematically a first embodiment of a drying unit of the dishwasher according to the invention.
Figure 4:
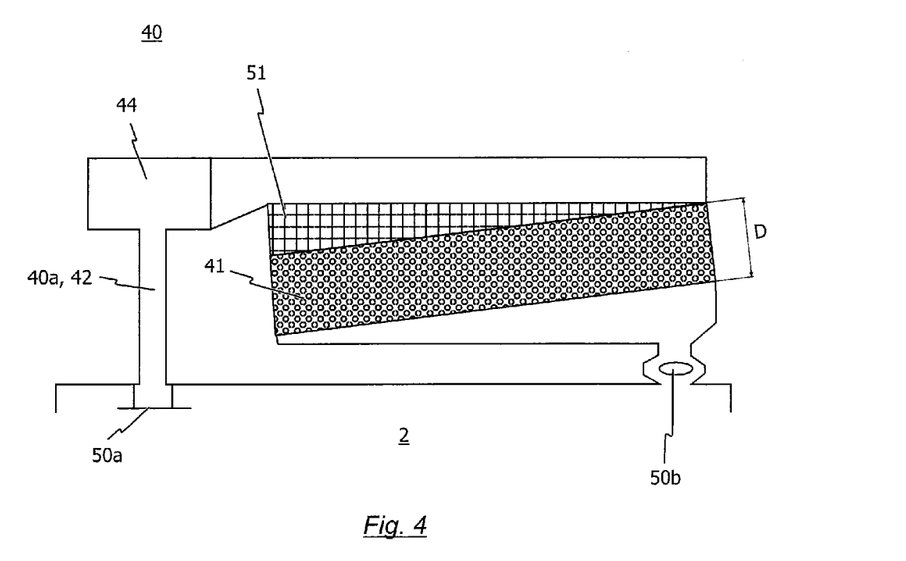
FIG. 4 shows schematically a second embodiment of a drying unit for a dishwasher according to the invention.

FIGS. 3 and 4 illustrate schematic views of two different embodiments of the drying device 40. The drying devices here are connected to the treatment chamber 2 via an air inlet 40a and also via an air outlet 40b. In order effectively to protect the sorption unit 41 from splashed water from the treatment chamber 2, the drying device 40 of the dishwasher 1 has a first splashed water protection device 50a between the air inlet 40a and the treatment chamber 2. In addition or alternatively thereto, the dishwasher can have a second splashed water protection device 50b between the air outlet 40b and the treatment chamber 2. The splashed water protection devices illustrated schematically in FIGS. 3 and 4 are, for example, curved lines, protective covers or lines with an obstacle. Of course, the splashed water devices are not restricted to the exemplary embodiments illustrated.

The interior of the drying unit 40 contains a sorption unit 41 which consists of a reversibly dehydratable dry material which is held by a housing structure (for example perforated plates) which is not illustrated. The sorption unit 41 here is designed in particular in such a way that said sorption unit has a thickness D of 2 to 100 mm, preferably 10 to 50 mm and particularly preferably 15 to 40 mm, along the direction of flow of the air stream conducted out of the treatment chamber 2. The thickness of 2 to 100 mm ensures that the moist machine air is sufficiently dried without having to accept too high a flow resistance.

The drying device 40 advantageously has a first air distributor 51 which is arranged between the fan 44 and the sorption unit 41 and is intended to orient the air stream perpendicularly to an entry surface of the sorption unit 41. In the embodiment according to FIG. 3, the first air distributor 51 accordingly has a multiplicity of air lamellae which are curved in such a manner that the air flow conveyed by the fan 44 is deflected at an angle of approximately 90° to the sorption unit 41. The individual air lamellae here become larger in size at increasing distance from the fan 44, as a result of which a uniform distribution of the air stream over the entire length of the sorption unit 41 is ensured. The air distributor 51 which is illustrated in FIG. 4 and is designed as a lattice behaves in a similar manner. At increasing distance from the fan 44, the thickness of the lattice, through which the air stream has to penetrate in order to reach the sorption unit 41, is reduced. It is therefore ensured in turn that identical portions of air flow even through the rear regions (on the right in the illustration). In other words, the flow resistance of the first air distributor, which is illustrated in FIG. 4, decreases at increasing distance from the fan 44, as a result of which a uniform distribution of the air stream within the sorption unit 41 is ensured.

The drying device 40 can furthermore have a second air distributor 52, as is illustrated, for example, in FIG. 3. The second air distributor 52 is preferably arranged between the sorption unit 41 and the treatment chamber 2. The second air distributor 52 here is arranged in relation to the first air distributed 51 in such a way that the air stream is uniformly distributor over all of the dry material of the sorption unit 41. Specifically, it is preferably possible to influence the air flow within the sorption material 41 by means of the second air distributor 52. For this purpose, the second air distributor is preferably designed as a perforated plate or slotted plate, wherein the latter has an inhomogeneous distribution of openings. Accordingly, an increased air stream can be forced through the sorption unit 41 at locations having a plurality of openings or larger openings, whereas a reduced flow takes place in the sorption unit 41 because of the increased flow resistance at locations having fewer or smaller openings or slots. A particularly homogeneous distribution of the air stream over all of the dry material of the sorption unit 41 can be achieved by a skilled combination of the first and second air distributors 51, 52.

The method according to the invention for operating a dishwasher 1 in the form of a batch dishwasher will be explained in more detail below with reference to the embodiments illustrated in FIGS. 1 to 4:

In a first method step, during an adsorption phase, air is conducted out of the treatment chamber 2 through a sorption unit 41, which contains a reversibly dehydratable dry material, in such a way that the dry material absorbs moisture from the air stream, wherein the air is then returned to the treatment chamber 2. During this "adsorption phase", in which moisture from air extracted from the treatment chamber 2 is adsorbed by the dry material of the sorption unit 41, adsorption heat is also released, as a consequence of which the air which has been conducted through the sorption unit 41 is correspondingly heated. The hot air which is dried following passage through the sorption unit 41 is returned to the treatment chamber 2 of the dishwasher 1 and can be used for drying the washware accommodated in the treatment chamber 2. In this respect, it is preferred if the adsorption phase of the sorption unit 41 takes place simultaneously or in a chronologically overlapping manner with the drying phase of the dishwasher 1 in order to be able to use the heat released during the adsorption of moisture from the dry material of the sorption unit 41 in order to dry the washware. The higher air temperature here permits a significant improvement in the drying quality especially for washware made from plastics material. In particular, the drying time can therefore also be considerably reduced under some circumstances. This is an important factor in particular for commercial dishwashing.

The desorption phase, during which the dry material of the sorption unit 41 is heated and air is conducted out of the treatment chamber 2 through the sorption unit 41, which contains the heated dry material, constitutes a second method step of the method according to the invention. Moisture here is desorbed from the dry material and at least some of the thermal energy which has previously been introduced into the dry material and at least some of the moisture desorbed from the dry material are discharged out of the sorption unit 41 as steam with the aid of the air stream conducted through the sorption unit 41. The steam arising in the process can be used, for example, for steam cleaning the washware during the final-rinse phase. In this respect, it is preferred if the second method step, i.e. the desorption phase, at least partly takes place during the wash phase and/or at least partly takes place during the final-rinse phase, in order to be able to use the steam arising during the desorption operation for further cleaning of the washware. The use of the steam makes it conceivable in particular to be able partially or entirely to dispense with environmentally harmful chemicals which are used, for example, during the final-rinse process.

It should be noted at this juncture that the amount of moisture in the dry material of the sorption unit 41 can be determined continuously or at predefinable times or in the case of predefinable events during the adsorption phase and/or the desorption phase. This takes place in particular by means of a sensor unit which, for example, measures the weight of the dry material, the duration of the desorption phase, the moisture content or the temperature of the air at the air outlet of the drying device. The sensor unit (not illustrated) can therefore be used together with the program control unit in order to initiate the different program sequences on the basis of the moisture content of the dry material.

Furthermore, it is preferred if the adsorption phase takes up 30 sec to 5 min, preferably 1 min to 3 min. In contrast, the desorption phase can take place within 5 sec to 5 min, preferably 20 sec to 3 min and particularly preferably 1 min to 2 min.

In the case of commercial dishwashers, it is important in particular for the desorption phase to operate as sufficiently as possible and to be short. For this purpose, as great a quantity of heat as possible has to be introduced into the sorption material within as short a time as possible, wherein care has to be taken at the same time to ensure that the sorption material does not overheat. For this purpose, it is provided in the solution according to the invention that electrical heating coils are arranged in the sorption unit in order, in the desorption phase, to introduce the thermal energy, which is necessary for regenerating the dry material, into the sorption material directly. In addition thereto, care should be taken to ensure that, during each desorption phase, the sorption unit 41 is at least subjected to forced ventilation in such a way that recondensation of desorbed steam in the sorption unit 41 is effectively prevented. In particular, care should be taken to ensure that condensate which could lead to damage, for example, of the heating unit 45 integrated in the sorption unit, cannot form in the interior of the sorption unit.

It has been shown in this connection that even 10 liters of air are sufficient in order effectively to expel the desorbed steam from the sorption unit during a desorption phase. Of course, however, greater quantities of air which are blown through the sorption unit 41, for example by means of the fan 44, during the desorption phase are also possible.

The air is preferably blown continuously or intermittently through the sorption unit 41 during each desorption phase.

According to one aspect of the invention, it is provided that the temperature of the heated dry material is measured continuously or at predefined or predefinable times or in the case of predefined or predefinable events in the sorption unit 41 during each desorption phase, and wherein the output capacity of the fan 44 is controlled as a function of the measured temperature of the heated dry material in such a way that the dry material assumes a temperature of 150° C. to 300° C., and preferably always less than 500° C.

According to a further aspect of the invention, it is provided that the temperature of the air which is forced through the heated dry material is measured continuously or at predefined or predefinable times or in the case of predefined or predefinable events during each desorption phase, and wherein the output capacity of the fan 44 is controlled as a function of the measured temperature of the air which is forced through the heated dry material in such a way that the air which is forced through the dry material assumes a temperature of less than 200° C., and preferably of less than 150° C.

According to one aspect of the invention, it is provided that each desorption phase takes place within a time period of from 20 to 150 seconds, and preferably in a time period of from 40 to 90 seconds.

According to one aspect of the invention, it is provided that a total of 60 to 1000 kJ, and preferably a total of 150 to 500 kJ, of thermal energy is supplied to the dry material during each desorption phase.

According to one aspect of the invention, it is provided that the fan 44 is actuated in such a way that the volumetric flow rate of air which is forced through the dry material during each desorption phase is in a range of between 0.5 to 200 m$^3$/h, and preferably in a range of between 0.10 to 40 m$^3$/h.

According to one aspect of the invention, it is provided that each desorption phase is subdivided with respect to time into an initial first time period and a subsequent second time period, and wherein the fan 44 is actuated in such a way that a quantity of air which is forced through the dry material during the first time period per unit time is lower than a quantity of air which is forced through the dry material during the subsequent second time period per unit time. The dry material can thereby be heated even more rapidly.

According to one aspect of the invention, it is provided that each desorption phase is subdivided with respect to time into an initial heating phase, during which thermal energy is supplied to the dry material with the aid of a heating device at the same time as forced ventilation, and into a subsequent follow-up phase, during which only forced ventilation takes place and no thermal energy is supplied to the dry material by means of the heating device.

The invention is not restricted to the embodiments of a dishwasher according to the invention that are illustrated in the figures, but rather is revealed with reference to an overview of all of the features disclosed therein. In particular, the invention can also be used equivalently in the technical field of washer dryers. Furthermore, it should be mentioned that the drying device 40 is not restricted to having an individual fan 44 and an individual sorption unit 41, but rather it is entirely possible for the drying device to include two or more of these components. As has already been mentioned above, the drying device 40 can also have, for example, a heat exchanger (not illustrated) which serves for further reducing the energy consumption.

| List of Reference Numbers | |
|---|---|
| 1 | Dishwasher |
| 2 | Treatment chamber |
| 3 | Washwater |
| 4 | Discharge line |
| 5 | Drainage pump |
| 11a, 11b | Wash nozzles |
| 12 | Wash tank |
| 13 | Wash pump |
| 14 | Final-rinse pump |
| 15a, 15b | Final-rinse nozzles |
| 16 | Wash liquid line system |

| List of Reference Numbers | |
|---|---|
| 17 | Final-rinse liquid line system |
| 22 | Boiler |
| 30 | Fresh-water supply line |
| 39 | Steam generator |
| 40 | Drying unit |
| 40a | Air inlet |
| 40b | Air outlet |
| 41 | Sorption unit |
| 42 | Inlet line |
| 43 | Outlet line |
| 44 | Fan |
| 45 | Heating unit |
| 46 | Steam outlet |
| 46a | Steam line |
| 47 | Heater |
| 48 | Level sensor |
| 49 | Valve |
| 50a | First splashed water protection device |
| 50b | Second splashed water protection device |
| 51 | First air distributor |
| 52 | Second air distributor |

The invention claimed is:

1. A method for operating a dishwasher, which dishwasher has a treatment chamber for accommodating washware which is to be cleaned, wherein the method comprises the following method steps:
   i) during an adsorption phase, air is conducted out of the treatment chamber through a sorption unit, which contains a reversibly dehydratable dry material, in such a way that the dry material absorbs moisture from the air stream, wherein the air is then returned to the treatment chamber; and
   ii) during a desorption phase, the dry material of the sorption unit is heated in such a way that moisture is desorbed from the dry material as steam,
   wherein, during the desorption phase, the sorption unit is subjected to forced ventilation only to such an extent that recondensation of desorbed steam in the sorption unit itself is effectively prevented;
      wherein the desorption phase takes place within a time period of from 20 to 150 seconds in total;
      wherein, for forced ventilation of the sorption unit, a fan is actuated in such a way that a volumetric flow rate of air which is forced through the dry material during the desorption phase is in a range of between 0.05 and 200 m$^3$/h.

2. The method as claimed in claim 1, wherein a total of at least 10 litres of air is blown through the sorption unit during the desorption phase.

3. The method as claimed in claim 1, wherein, during the desorption phase, the sorption unit is subjected to forced ventilation in such a way that moisture which is desorbed from the dry material is discharged from the sorption unit as steam such that recondensation in the sorption unit is specifically effectively prevented.

4. The method as claimed in claim 1, wherein the air is continuously or intermittently blown through the sorption unit by a fan during the desorption phase.

5. The method as claimed in claim 4, wherein the temperature of the heated dry material is measured continuously or at predefined times or in the case of predefined events in the sorption unit during the desorption phase, and wherein the output capacity of the fan is controlled as a function of the measured temperature of the heated dry material in such a way that the dry material assumes a temperature of less than 300° C.

6. The method as claimed in claim 4, wherein the temperature of the air which is forced through the heated dry material is measured continuously or at predefined times or in the case of predefined events during the desorption phase, and wherein the output capacity of the fan is controlled as a function of the measured temperature of the air which is forced through the heated dry material in such a way that the air which is forced through the dry material assumes a temperature of less than 200° C.

7. The method as claimed in claim 1, wherein the temperature of the heated dry material is measured continuously or at predefined times or in the case of predefined events in the sorption unit during the desorption phase, and wherein the heating power of a heating unit which is arranged in the sorption unit is controlled as a function of the measured temperature of the heated dry material in such a way that the dry material assumes a temperature of less than 300° C. in the desorption phase.

8. The method as claimed in claim 1, wherein a total of 60 to 1000 kJ of thermal energy is supplied to the dry material during the desorption phase.

9. The method as claimed in claim 1, wherein the thermal energy is supplied by a heating power of a total of 3 to 7 kW during the desorption phase.

10. The method as claimed in claim 1, wherein the desorption phase is subdivided with respect to time into an initial first time period and a subsequent second time period, and wherein a fan is actuated in such a way that a quantity of air which is forced through the dry material during the first time period per unit time is lower than a quantity of air which is forced through the dry material during the subsequent second time period per unit time.

11. The method as claimed in claim 1, wherein the desorption phase is subdivided with respect to time into an initial heating phase, during which thermal energy is supplied to the dry material with the aid of a heating device at the same time as forced ventilation, and into a subsequent follow-up phase, during which only forced ventilation takes place and no thermal energy is supplied to the dry material by the heating device.

12. The method as claimed in claim 1, wherein the method also comprises the following program-controlled method steps which are to be executed one after the other:
   a) during a wash phase, wash liquid is sprayed into the treatment chamber from a tank with the aid of a wash pump by means of a wash line system through wash nozzles, wherein at least some of the sprayed wash liquid flows back from the treatment chamber into the tank due to the force of gravity; and
   b) during a final-rinse phase, final-rinse fluid is conducted into the treatment chamber,
   wherein method step ii) takes place at least partly during the wash phase and/or at least partly during the final-rinse phase.

13. The method as claimed in claim 12, wherein method step i) is carried out at the same time as or so as to overlap, with respect to time, with a drying phase which takes place following the final-rinse phase.

14. The method as claimed in claim 12, wherein method step a) lasts for a total of 5 seconds to 360 seconds.

15. A batch dishwasher comprising:
   a treatment chamber, into which washware can be manually inserted and from which washware can be manually removed;
   a tank, into which liquid can flow off from the treatment chamber due to the force of gravity;

a wash system having a wash pump and a wash line system for conveying wash liquid out of the tank during a wash phase and for spraying the wash liquid through wash nozzles in the treatment chamber;

a fresh-water final-rinse system having at least one final-rinse pump and at least one final-rinse line system for conveying final-rinse liquid out of a fresh-water supply device during a fresh-water final-rinse phase and for spraying the final-rinse liquid through final-rinse nozzles in the treatment chamber;

a drying device for continuously drawing moisture, or drawing moisture as required, from drying air which circulates in the treatment chamber, wherein the drying device has at least one sorption unit, which contains a reversibly dehydratable dry material, and also at least one fan for forming an air circuit as required in such a way that air is conducted through the sorption unit and then supplied to the treatment chamber; and a control device for carrying out the the following steps:
(i) performing an adsorption phase in which air is conducted out of the treatment chamber through the sorption unit so that the dry material absorbs moisture from the air and the air is then returned to the chamber; and
(ii) performing a desorption phase in which the dry material of the sorption unit is heated such that moisture is desorbed from the dry material and returned to the treatment chamber;
wherein the control device is configured to control the sorption unit such that the desorption phase takes place within a time period of from 20 to 150 seconds in total and, for forced ventilation of the sorption unit, the fan is actuated in such a way that a volumetric flow rate of air which is forced through the dry material during the desorption phase is in a range of between 0.05 and 200 $m^3/h$.

16. The dishwasher as claimed in claim 15, wherein the reversibly dehydratable dry material contains 0.3 to 3.0 kg of zeolite-containing material in the form of granules having a particle diameter of 0.5 to 10.0 mm.

17. The dishwasher as claimed in claim 15, wherein the drying device also has a heating unit for heating the reversibly dehydratable dry material as required, wherein the heating unit has a large number of heating elements which are preferably arranged at uniform distances within the reversibly dehydratable dry material.

18. The dishwasher as claimed in claim 17, wherein the drying device also has a heat exchanger unit which is connected to the sorption unit in such a way that, when an air circuit is formed, at least some of the air stream which is routed through the sorption unit also passes the heat exchanger unit.

19. A method for operating a dishwasher, which dishwasher has a treatment chamber for accommodating washware which is to be cleaned, wherein the method comprises the following method steps:
i) during an adsorption phase, air is conducted out of the treatment chamber through a sorption unit, which contains a reversibly dehydratable dry material, in such a way that the dry material absorbs moisture from the air stream, wherein the air is then returned to the treatment chamber; and
ii) during a desorption phase, the dry material of the sorption unit is heated in such a way that moisture is desorbed from the dry material as steam,
wherein, during the desorption phase, the sorption unit is subjected to forced ventilation to such an extent that recondensation of desorbed steam in the sorption unit itself is effectively prevented;
wherein operation of a fan during the desorption face, for the purpose of forced ventilation, is subdivided with respect to time into an initial first time period and a subsequent second time period, and wherein the fan is actuated in such a way that a quantity of air which is forced through the dry material during the first time period per unit time is lower than a quantity of air which is forced through the dry material during the subsequent second time period per unit time.

20. The method of claim 19,
wherein heating of the dry material during the desorption phase is subdivided with respect to time into an initial heating phase, during which thermal energy is supplied to the dry material with the aid of a heating device at the same time as forced ventilation, and into a subsequent follow-up phase, during which only forced ventilation takes place and no thermal energy is supplied to the dry material by the heating device.

* * * * *